United States Patent
Guizilini et al.

(10) Patent No.: US 12,488,483 B2
(45) Date of Patent: Dec. 2, 2025

(54) GEOMETRIC 3D AUGMENTATIONS FOR TRANSFORMER ARCHITECTURES

(71) Applicant: Toyota Research Institute, Inc., Los Altos, CA (US)

(72) Inventors: Vitor Guizilini, Santa Clara, CA (US); Igor Vasiljevic, Pacifica, CA (US); Adrien D. Gaidon, San Jose, CA (US); Jiading Fang, Chicago, IL (US); Gregory Shakhnarovich, Chicago, IL (US); Matthew R. Walter, Chicago, IL (US); Rares A. Ambrus, San Francisco, CA (US)

(73) Assignees: Toyota Research Institute, Inc., Los Altos, CA (US); Toyota Jidosha Kabushiki Kaisha, Aichi-ken (JP); Toyota Technological Institute at Chicago, Chicago, IL (US)

( * ) Notice: Subject to any disclaimer, the term of this patent is extended or adjusted under 35 U.S.C. 154(b) by 366 days.

(21) Appl. No.: 18/110,421

(22) Filed: Feb. 16, 2023

(65) Prior Publication Data
US 2024/0029286 A1  Jan. 25, 2024

Related U.S. Application Data

(60) Provisional application No. 63/392,114, filed on Jul. 25, 2022.

(51) Int. Cl.
G06K 9/00 (2022.01)
G06T 7/593 (2017.01)
G06T 7/80 (2017.01)

(52) U.S. Cl.
CPC ............... *G06T 7/593* (2017.01); *G06T 7/85* (2017.01); *G06T 2207/10024* (2013.01); *G06T 2207/10028* (2013.01); *G06T 2207/20081* (2013.01)

(58) Field of Classification Search
CPC . G06T 7/593; G06T 7/85; G06T 2207/10024; G06T 2207/10028;
(Continued)

(56) References Cited

U.S. PATENT DOCUMENTS 8,619,082 B1  12/2013  Ciurea et al.
10,390,005 B2  8/2019  Nisenzon et al.
(Continued)

FOREIGN PATENT DOCUMENTS

EP  3428875 A1 *  1/2019  ........... H04N 23/698
WO  WO-2022221267 A2 *  10/2022  ............. G06T 11/00

*Primary Examiner* — Shervin K Nakhjavan
(74) *Attorney, Agent, or Firm* — Dinsmore & Shohl LLP

(57) ABSTRACT

A method of generating additional supervision data to improve learning of a geometrically-consistent latent scene representation with a geometric scene representation architecture is provided. The method includes receiving, with a computing device, a latent scene representation encoding a pointcloud from images of a scene captured by a plurality of cameras each with known intrinsics and poses, generating a virtual camera having a viewpoint different from viewpoints of the plurality of cameras, projecting information from the pointcloud onto the viewpoint of the virtual camera, and decoding the latent scene representation based on the virtual camera thereby generating an RGB image and depth map corresponding to the viewpoint of the virtual camera for implementation as additional supervision data.

17 Claims, 5 Drawing Sheets

(58) Field of Classification Search
CPC . G06T 2207/20081; G06T 2207/20056; G06T 2207/20084; G06T 7/596
See application file for complete search history.

(56) References Cited

U.S. PATENT DOCUMENTS

| | | | | |
|---|---|---|---|---|
| 10,452,927 B2 * | 10/2019 | Stojanović | ............. | G06V 20/13 |
| 10,826,786 B2 * | 11/2020 | Eckart | ................ | G06F 16/2246 |
| 10,915,793 B2 * | 2/2021 | Corral-Soto | ......... | G06V 10/454 |
| 11,107,228 B1 * | 8/2021 | Shrivastava | ............ | G06T 11/00 |
| 11,238,650 B2 * | 2/2022 | Li | ........................ | G06V 10/776 |
| 11,250,616 B2 * | 2/2022 | Kaplan | ................ | G06T 15/205 |
| 11,288,857 B2 | 3/2022 | Meshry et al. | | |
| 11,605,151 B2 * | 3/2023 | Holzer | ................. | G06T 7/0004 |
| 11,625,864 B2 * | 4/2023 | Engelland-Gay | ....... | G06T 17/20 382/232 |
| 11,663,778 B2 * | 5/2023 | Hosfield | ................ | G06T 15/20 345/423 |
| 11,670,088 B2 * | 6/2023 | Voodarla | ................. | H04W 4/46 382/104 |
| 11,721,044 B2 * | 8/2023 | Fleureau | ................. | G06T 15/20 345/419 |
| 11,975,738 B2 * | 5/2024 | Singh | ....................... | G06T 11/20 |
| 11,995,749 B2 * | 5/2024 | Borer | ...................... | G06T 13/40 |
| 12,014,446 B2 * | 6/2024 | Koh | ...................... | G06F 18/213 |
| 12,052,408 B2 * | 7/2024 | Tauber | ................. | H04N 13/349 |
| 12,100,230 B2 * | 9/2024 | Wang | ..................... | G06V 10/26 |
| 12,243,273 B2 * | 3/2025 | Lv | ......................... | G06T 15/205 |
| 2020/0041276 A1 * | 2/2020 | Chakravarty | ...... | G01C 21/3848 |
| 2020/0294194 A1 * | 9/2020 | Sun | ..................... | H04N 23/698 |
| 2020/0380762 A1 | 12/2020 | Karafin et al. | | |
| 2021/0133990 A1 * | 5/2021 | Eckart | ...................... | G06T 7/344 |
| 2021/0358193 A1 | 11/2021 | Oz et al. | | |
| 2022/0079510 A1 | 3/2022 | Robillard et al. | | |
| 2023/0334764 A1 * | 10/2023 | Lee | ......................... | G06T 15/10 |
| 2023/0342507 A1 * | 10/2023 | Beltrand | ................... | G06T 7/12 |

* cited by examiner

GEOMETRIC 3D AUGMENTATIONS FOR TRANSFORMER ARCHITECTURES

CROSS-REFERENCE TO RELATED APPLICATIONS

The present application claims priority to U.S. Provisional Patent Application 63/392,114 filed on Jul. 25, 2022 and entitled "Geometric 3D Augmentations for Transformer Architectures," which is hereby incorporated by reference in its entirety.

TECHNICAL FIELD

The present specification relates to systems and methods providing data augmentation techniques for encoding multi-view geometry to increase the diversity of available supervision data for training transformer architectures.

BACKGROUND

Estimating 3D structure from a pair of images is a cornerstone problem of computer vision. Traditionally, this is treated as a correspondence problem, whereby one applies a homography to stereo rectify the image pair based on known calibration, and then matches pixels (or patches) along epipolar lines to obtain disparity estimates. Given a sufficiently accurate calibration (i.e., intrinsics and extrinsics), this disparity map can then be converted into a per-pixel depth map. Approaches to stereo are specialized variants of classical methods, relying on correspondence and computing stereo matching and cost volumes, epipolar losses, bundle adjustment objectives, or projective multi-view constraints, among others, that are either baked into the model architecture or enforced as part of the loss function. Applying the principles of classical vision in this way has had some success, but comes at a cost. Each architecture is specialized and purpose-built for a single task, and typically relies on an accurate underlying dataset-specific calibration.

Specialized architectures for geometric computer vision tasks incorporate the strengths of classical approaches, but also inherit their limitations. Multi-view and video-based models rely on loss-level geometric constraints, using neural networks to map image data to classical structures such as cost volumes. While these architectures have made strides in the past few years, they are typically slow, memory-intensive, and sensitive to calibration errors. A recent trend in learning-based computer vision is to replace loss and architecture-level specialization with generalist architectures, and instead encode geometric priors at the input level. These generalist architectures can perform on both stereo depth estimation and light-field view synthesis. However, the generalization power of these models is limited by the lack of appropriate 3D supervision.

Accordingly, a need exists for data augmentation techniques for encoding multi-view geometry to increase the diversity of available supervision data.

SUMMARY

In one embodiment, a method of generating additional supervision data to improve learning of a geometrically-consistent latent scene representation with a geometric scene representation architecture is provided. The method includes receiving, with a computing device, a latent scene representation encoding a pointcloud from images of a scene captured by a plurality of cameras each with known intrinsics and poses, generating a virtual camera having a viewpoint different from viewpoints of the plurality of cameras, projecting information from the pointcloud onto the viewpoint of the virtual camera, and decoding the latent scene representation based on the virtual camera thereby generating an RGB image and depth map corresponding to the viewpoint of the virtual camera for implementation as additional supervision data.

In another embodiment, a system for generating additional supervision data to improve learning of a geometrically-consistent latent scene representation with a geometric scene representation architecture is provided. The system includes one or more processors and a non-transitory, computer-readable medium storing instructions. The non-transitory, computer-readable medium storing instructions, when executed by the one or more processors, cause the one or more processors to: receive a latent scene representation encoding a pointcloud from images of a scene captured by a plurality of cameras each with known intrinsics and poses, generate a virtual camera having a viewpoint different from viewpoints of the plurality of cameras, project information from the pointcloud onto the viewpoint of the virtual camera, and decode the latent scene representation based on the virtual camera thereby generating an RGB image and depth map corresponding to the viewpoint of the virtual camera for implementation as additional supervision data.

In another embodiment, a computing program product for generating additional supervision data to improve learning of a geometrically-consistent latent scene representation with a geometric scene representation architecture is provided. The computing program product incudes machine-readable instructions stored on a non-transitory computer readable memory, which when executed by a computing device, causes the computing device to carry out steps including receiving, with a computing device, a latent scene representation encoding a pointcloud from images of a scene captured by a plurality of cameras each with known intrinsics and poses, generating a virtual camera having a viewpoint different from viewpoints of the plurality of cameras, projecting information from the pointcloud onto the viewpoint of the virtual camera, and decoding the latent scene representation based on the virtual camera thereby generating an RGB image and depth map corresponding to the viewpoint of the virtual camera for implementation as additional supervision data.

BRIEF DESCRIPTION OF THE DRAWINGS

The embodiments set forth in the drawings are illustrative and exemplary in nature and are not intended to limit the disclosure. The following detailed description of the illustrative embodiments can be understood when read in conjunction with the following drawings, where like structure is indicated with like reference numerals.

DETAILED DESCRIPTION

Embodiments of the present disclosure are directed to a geometric scene representation (GSR) architecture for depth synthesis, including estimation, interpolation, and extrapolation. In embodiments, the architecture includes a series of geometric 3D data augmentation techniques designed to promote learning of a geometrically-consistent latent scene representation, as well as view synthesis as an auxiliary task. Such embodiments improve the Perceiver IO and Input-level Inductive Biases (IIB) frameworks beyond optical flow and stereo regression to the domain of scene representation learning. The video-based representation aided by geometric augmentations allows the GSR architecture to interpolate and extrapolate depth from unseen viewpoints, rather than be restricted to the stereo depth estimation setting.

Figure 2A:
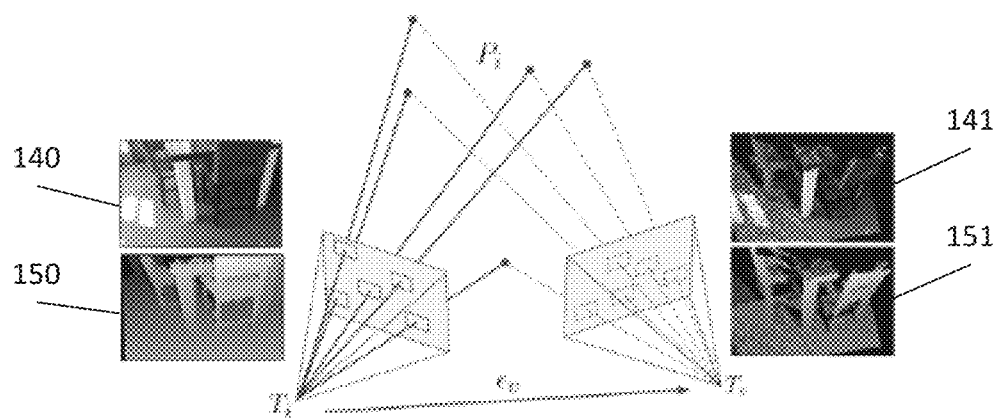
FIG. 2A schematically depicts an embodiment of a virtual camera based on a new viewpoint projection according to one or more embodiments shown and described herein.
Figure 2B:
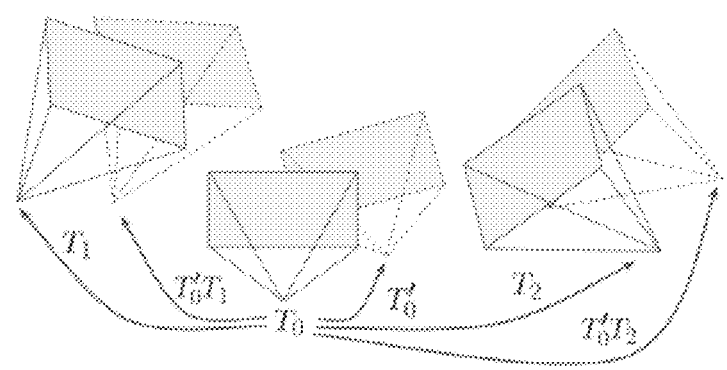
FIG. 2B schematically depicts an embodiment of another virtual camera projection based on canonical jittering according to one or more embodiments shown and described herein.

Data augmentation is a core component of deep learning pipelines that improves model robustness by applying transformations to the training data consistent with the data distribution in order to introduce desired equivariant properties. In computer vision and depth estimation in particular, standard data augmentation techniques are usually constrained to the 2D space and include color jittering, flipping, rotation, cropping, and resizing. Embodiments of the present disclosure focus on encoding scene geometry at the input-level, so the GSR architecture can learn a multi-view consistent geometric latent scene representation. To do so, a series of 3D augmentations is generated and used as additional supervision data to increase the number of training views while maintaining the spatial relationship between cameras. To enforce the desired equivariant properties within this setting various geometric augmentations are implemented, for example, as depicted in FIGS. 2A and 2B and described in more detail herein.

One of the key properties of the architecture is that it enables querying from arbitrary viewpoints, since only camera information (viewing rays) is required at the decoding stage. When generating predictions from these novel viewpoints, the network creates "virtual" information consistent with the implicit structure of the learned latent scene representation, conditioned on information from the encoded views. The same property may be leveraged during training as well by generating additional supervision in the form of virtual cameras with corresponding ground-truth RGB images and depth maps obtained by projecting available information onto these new viewpoints as depicted in FIGS. 2A and/or 2B, for example. The augmentation technique enforces the learned latent scene representation to be viewpoint-independent.

Figure 1A:
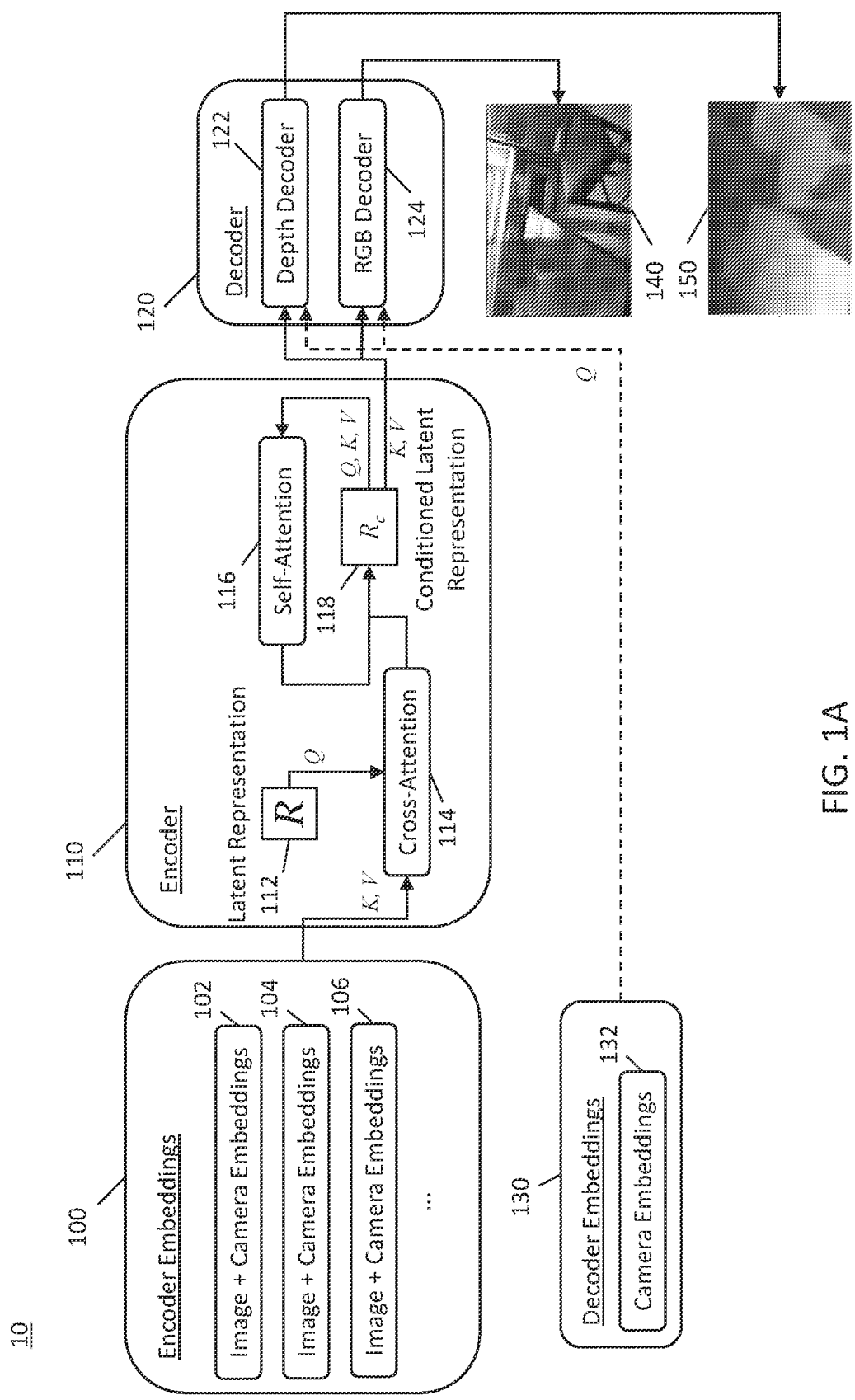
FIG. 1A schematically depicts a geometric scene representation architecture according to one or more embodiments shown and described herein.

Turning now to the drawings where like numbers refer to like structures, and particularly to FIG. 1A which schematically depicts a GSR architecture 10. Embodiments of the present disclosure include a GSR architecture 10 that is designed with flexibility, so data from different sources can be used as input and different output tasks can be estimated from the same latent space. For example, embodiments utilize Perceiver IO as the general-purpose transformer backbone. During the encoding stage 100, the GSR architecture 10 ingests images and camera embeddings 102, 104, 106 from a plurality of calibrated cameras, with known intrinsics and relative poses. The GSR architecture 10 processes this information according to the modality into different pixel-wise embeddings that serve as input to the backbone of GSR architecture 10. This encoded information can be queried using only camera embeddings 132, producing estimates from arbitrary viewpoints.

The GSR architecture 10 alleviates one of the main weaknesses of transformer-based methods, namely the quadratic scaling of self-attention with input size. This is achieved by using a fixed-size $N_l \times C_l$ latent scene representation R 112, and learning to project high-dimensional $N_e \times C_e$ embeddings onto this latent representation using cross-attention layers 114. The architecture then performs self-attention 116 in this lower-dimensional space, producing a conditioned latent representation $R_c$ 118, that can be queried using $N_d \times C_d$ embeddings during the decoding stage 120 to generate estimates, such as estimated scene images 140 and estimated depth maps 150, using cross-attention layers implemented by a depth decoder 122 and a RGB decoder 124, respectively, for example. Additionally, as depicted in FIG. 1A, Q refers to a vector related with the encoded information. Additionally, K is a vector related to the input information used to generate the output and V is the learned vector as a result of the calculations, related with the input information.

Figure 1B:
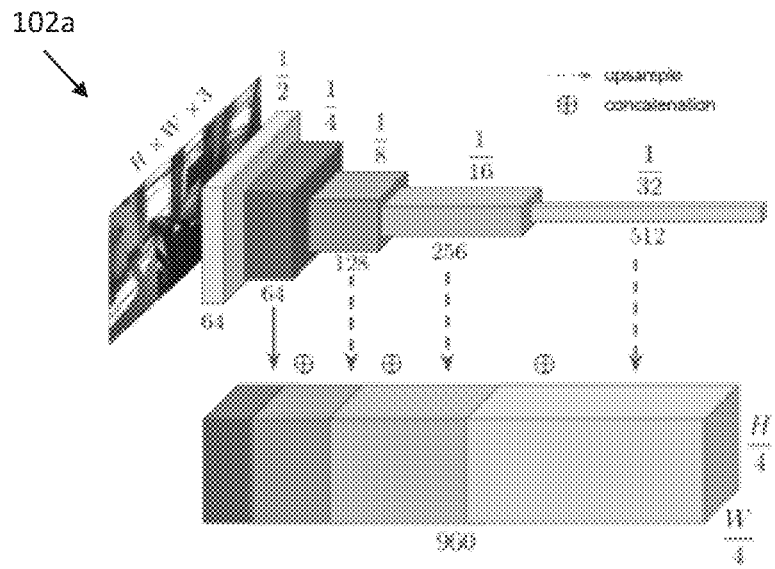
FIG. 1B schematically depicts an image embedding according to one or more embodiments shown and described herein.

FIG. 1B schematically depicts an image embedding of the GSR architecture 10. As an example, the input images 102a, having dimensions H×W×3, are processed using a ResNet18 encoder, producing a list of features maps at increasingly lower resolutions and higher dimensionality. Feature maps at ¼ the original resolution are concatenated with lower-resolution feature maps, after up-sampling using bilinear interpolation. The resulting image embeddings 102a are of shape H/4×W/4×960, and are used in combination with the camera embeddings 102b (FIG. 1C) from each corresponding pixel to encode visual information.

Figure 1C:
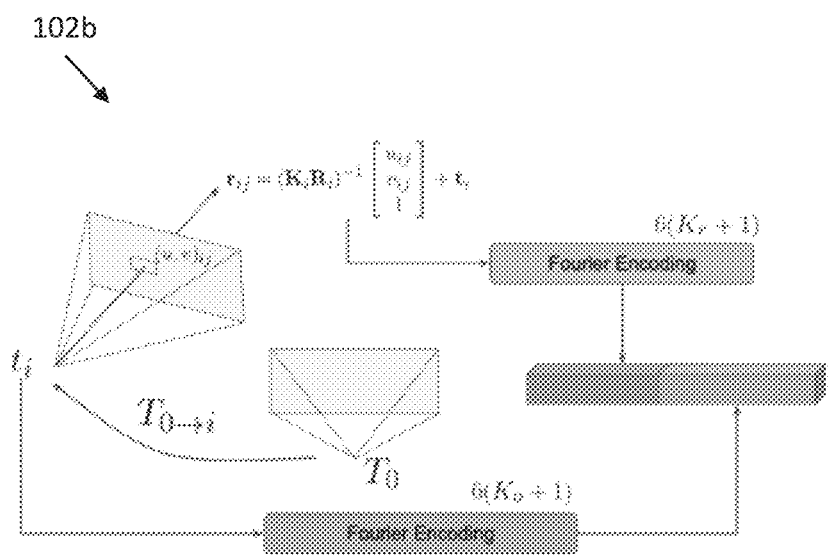
FIG. 1C schematically depicts a camera embedding according to one or more embodiments shown and described herein.

FIG. 1C schematically depicts a camera embedding of the GSR architecture 10. These embeddings capture multi-view scene geometry (e.g., camera intrinsics and extrinsics) in a way that can be used by the GSR architecture 10 as additional inputs during the learning process. Let $x_{ij}=(u,v)$ be an image coordinate corresponding to pixel i in camera j, with assumed known pinhole 3×3 intrinsics $K_j$ and 4×4 transformation matrix $$T_j = \begin{bmatrix} R & t \\ 0 & 1 \end{bmatrix}$$

relative to a canonical camera $T_0$. Its origin $o_j$ and direction $r_{ij}$ are given by:

$$o_j = -R_t t_j, \; r_{ij} = (K_j R_j)^{-1} \begin{bmatrix} u_{ij} \\ v_{ij} \\ 1 \end{bmatrix} + t_j \quad (1)$$

Note that this formulation differs slightly from the standard convention, which does not consider the camera translation $t_j$ when generating viewing rays $r_{ij}$. By ablating this variation, as shown in Table 1, it is shown that the GSR architecture 10 leads to better performance for the task of depth estimation.

TABLE 1

Ablation table for ScanNet-Stereo, using different GSR variations.

| | | Lower is better ↓ | | | Higher is better ↑ | |
|---|---|---|---|---|---|---|
| Variation | Abs.Rel | Sqr.Rel | RMSE | $\delta_{1.25}$ | $\delta_{1.25}^2$ | $\delta_{1.25}^3$ |
| 1  Depth-Only | 0.098 | 0.046 | 0.257 | 0.902 | 0.972 | 0.990 |
| 2  w/Conv. RGB encoder (15) | 0.114 | 0.058 | 0.294 | 0.866 | 0.961 | 0.982 |
| 3  w/64-dim R18 RGB encoder | 0.104 | 0.049 | 0.270 | 0.883 | 0.966 | 0.985 |
| 4  w/o camera information | 0.229 | 0.157 | 0.473 | 0.661 | 0.874 | 0.955 |
| 5  w/o global rays encoding | 0.097 | 0.047 | 0.261 | 0.897 | 0.962 | 0.988 |
| 6  w/equal loss weights | 0.095 | 0.047 | 0.259 | 0.908 | 0.968 | 0.990 |
| 7  w/epipolar cues (54) | 0.094 | 0.048 | 0.254 | 0.905 | 0.972 | 0.990 |
| 8  w/o Augmentations | 0.117 | 0.060 | 0.291 | 0.870 | 0.959 | 0.981 |
| 9  w/o Virtual Cameras | 0.104 | 0.058 | 0.268 | 0.891 | 0.965 | 0.986 |
| 10  w/o Canonical Jittering | 0.099 | 0.046 | 0.261 | 0.897 | 0.970 | 0.988 |
| 11  w/o Canonical Randomization | 0.096 | 0.044 | 0.253 | 0.905 | 0.971 | 0.989 |
|     GSR | 0.093 | 0.042 | 0.246 | 0.911 | 0.974 | 0.991 |

These two vectors are then Fourier-encoded to produce higher-dimensional vectors. The Fourier encoding is performed dimension-wise with a mapping of:

$$x \rightarrow [x, \sin(f_1 \pi x), \cos(f_1 \pi x), \ldots, \sin(f_K \pi x), \cos(f_K \pi x)]^T, \quad (2)$$

where K is the number of Fourier frequencies used ($K_o$ for the origin and $K_r$ for the ray directions), equally spaced between $$\left[1, \frac{\mu}{2}\right].$$

The resulting camera embedding 102b is of dimensionality $2(3(K_o+1)+3(K_r+1))=6(K_o+K_r+2)$. During the encoding stage 100, camera embeddings 102, 104, 106 are produced per-pixel assuming a camera with ¼ the original input resolution, resulting in a total of $$\frac{HW}{16}$$

vectors. During the decoding stage 120, embeddings from cameras with arbitrary calibration (i.e., intrinsics and extrinsics) can be generated and queried to produce per-pixel estimates.

Referring now to FIGS. 2A and 2B, geometric 3D augmentations to improve learning of a geometrically-consistent latent scene representation with a geometric scene representation architecture will now be described. Data augmentation is a core component of deep learning pipelines that improves model robustness by applying transformations to the training data consistent with the data distribution in order to introduce desired equivariant properties. In computer vision and depth estimation in particular, standard data augmentation techniques are usually constrained to the 2D space and include color jittering, flipping, rotation, cropping, and resizing. In an effort to increase robustness to errors in scene geometry, in terms of camera localization (i.e., extrinsics) and parameters (i.e., intrinsics), 3D augmentations are implemented. In the present embodiments scene geometry is encoded at the input-level, so the GSR architecture can learn a multi-view consistent geometric latent scene representation. Accordingly, a series of 3D augmentations to increase the number of training views while maintaining the spatial relationship between cameras, thus enforcing desired equivariant properties within this setting will now be described.

In particular, FIG. 2A schematically depicts an embodiment of a virtual camera based on a new viewpoint projection. One of the key properties of the GSR architecture 10 is that it enables querying from arbitrary viewpoints, since only camera information (viewing rays) is required at the decoding stage. When generating predictions from these novel viewpoints, the network creates "virtual" information consistent with the implicit structure of the learned latent scene representation, conditioned on information from the encoded views. This capability enables superior performance relative to the explicit projection of information from encoded views. Here, the aforementioned feature leverages this property at training time as well, generating additional supervision in the form of virtual cameras with corresponding ground-truth RGB images and depth maps obtained by projecting available information onto these new viewpoints as depicted in FIG. 2A. The present augmentation technique enforces the learned latent scene representation to be viewpoint-independent. Additionally, experiments demonstrate that this approach provides benefits in both the stereo setting, with few available viewpoints; and the video setting, since sequential data tends to have similar viewpoints and a dominant camera direction. From a practical perspective, virtual cameras are generated by adding translation noise $\epsilon_v = (\epsilon_x, \epsilon_y, \epsilon_z)_v \sim N(0, \sigma_v)$ to the pose of a camera i. The viewing angle is set to point towards the center $c_i$ of the pointcloud $P_i$ generated by lifting information from the selected camera, which is also perturbed by $\epsilon_c = (\epsilon_x, \epsilon_y, \epsilon_z)_c \sim N(0, \sigma_v)$. When generating ground-truth information, the combined pointcloud $P_i$ of all available cameras $T_i$ is projected onto these new viewpoints $T_v$ as a way to preserve full scene geometry. Furthermore, because the resulting RGB image 141 and depth map 151 will be sparse, the efficiency is improved by only querying at these specific locations.

In another embodiment, the virtual camera is generated using canonical jittering. That is, referring to FIG. 2B an embodiment of another virtual camera projection based on canonical jittering is schematically depicted. For example, when operating in a multi-camera setting, the standard practice is to select one camera $T_0$ to be the canonical camera with identity extrinsics $T_0 = I_4$, and position all other cameras $T_1$, $T_2$ relative to it. Intuitively, scene geometry should be invariant to the translation and rotation of the entire sensor suite. To enforce this property on the learned latent scene representation of the GSR architecture 10, an amount of noise is injected to the canonical pose itself, so it is not located at the origin of the coordinate system anymore. This is different from methods that inject per-camera noise with the goal of increasing robustness to localization errors. Furthermore, noise is only injected once, on the canonical camera, and then propagated to other cameras, so relative scene geometry is preserved within a translation and rotation offset as depicted in FIG. 2B. Accordingly, this offset is reflected on the input-level embeddings produced by each camera, and thus forces the latent representation to be invariant to these transformations.

From a practical perspective, canonical jittering is achieved by randomly sampling translation $\epsilon_t=[\epsilon_x,\epsilon_y,\epsilon_z]^T \sim N(0,\sigma_t)$ and rotation $\epsilon_r=[\epsilon_\phi,\epsilon_\theta,\epsilon_\varphi]^T \sim N(0,\sigma_r)$ errors from normal distributions with pre-determined standard deviations. Rotation errors are in Euler angles, and are converted to a 3×3 rotation matrix $R_r$. These values are used to produce a jittered canonical transformation matrix $$T'_0 = \begin{bmatrix} R_r & \epsilon_t \\ 0 & 1 \end{bmatrix}$$

that is then propagated to all other N cameras, such that $T'_i = T'_0 \cdot \forall i \in \{1, \ldots, N-1\}$.

As an extension of canonical jittering, canonical randomization is introduced, which is designed to encourage generalization to different relative camera configurations, while still preserving scene geometry. Assuming a scene has N cameras, the process includes randomly selecting $o \in \{0, \ldots, N-1\}$ as the canonical index. Then, $\forall j \in [0, \ldots, N-1]$, the relative transformation matrix $T'_i$ given world-frame transformation matrix $T_i$ is given by $T'_i = T_i \cdot T_o^{-1}$. Note that this is performed before canonical jittering, so the randomly selected camera is perturbed after it has been canonicalized.

The GSR architecture 10 further implements decoders 120. The decoders 120 are task-specific decoders 122 and 124, each consisting of one cross-attention layer between the queries $N_d \times C_d$ and the $N_l \times C_l$ conditioned latent representation $R_c$, followed by a linear layer that creates an output of size $N_d \times C_o$, and a sigmoid activation function $$\sigma(x) = \frac{1}{1+e^{-x}}$$

to produce values between [0, 1]. For the depth estimation task, the process sets $C_o^d=1$ task and for view synthesis, the process sets $C_o^s=3$. Depth estimates are scaled between a minimum $d_{min}$ and maximum $d_{max}$ range. In embodiments, other decoders can be incorporated to the GSR architecture 10 without modification to the underlying architecture, enabling the generation of multi-task estimates from arbitrary viewpoints.

For the loss calculation of the GSR architecture 10, an L1-log loss $\mathcal{L}_d=\|\log(d_{ij})-\log(\hat{d}_{ij})\|$ is used to supervise depth estimation, and L2 loss $\mathcal{L}_s=\|p_{ij}-\hat{p}_{ij}\|^2$ is used to supervise view synthesis. To balance these two losses, a weight coefficient $\lambda_s$ is used. Another weight coefficient, $\lambda_v$ is used to balance losses from available and virtual cameras. The final loss is of the form:

$$\mathcal{L} = \mathcal{L}_d + \lambda_s \mathcal{L}_s + \lambda_v (\mathcal{L}_{d,v} + \lambda_s (\mathcal{L}_{s,v})) \quad (3)$$

In embodiments, since the architecture enables querying at specific image coordinates, at training time efficiency is improved by not computing estimates for pixels without corresponding ground-truth (e.g., sparse depth maps or virtual cameras).

Various embodiments for methods of generating additional supervision data to improve learning of a geometrically-consistent latent scene representation with a geometric scene representation architecture, as well as systems, and computer programs products that utilize such methods, are described in detail below.

Figure 3:
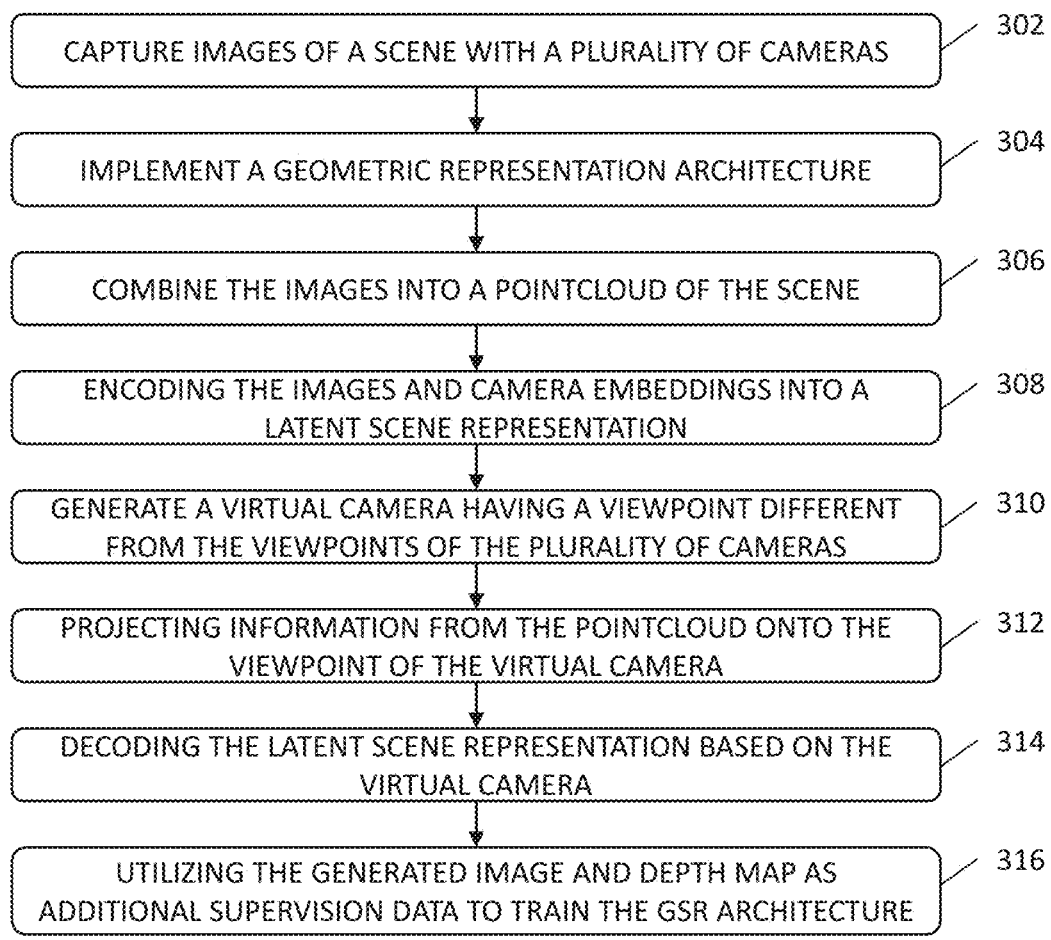
FIG. 3 illustrates a flowchart of an example method of generating additional supervision data to improve learning of a geometrically-consistent latent scene representation with a geometric scene representation architecture according to one or more embodiments described and illustrated herein.

FIG. 3 illustrates a flowchart 300 depicting an example method for generating additional supervision data to improve learning of a geometrically-consistent latent scene representation with the GSR architecture 10. The example method illustrated by FIG. 3 is employed by the GSR architecture 10 illustrated in FIG. 1 and further by the computing system depicted in FIG. 4. Reference will now be made to both FIGS. 1 and 5 in providing an overview of an example method for determining a shape and pose of an occluded object.

Figure 4:
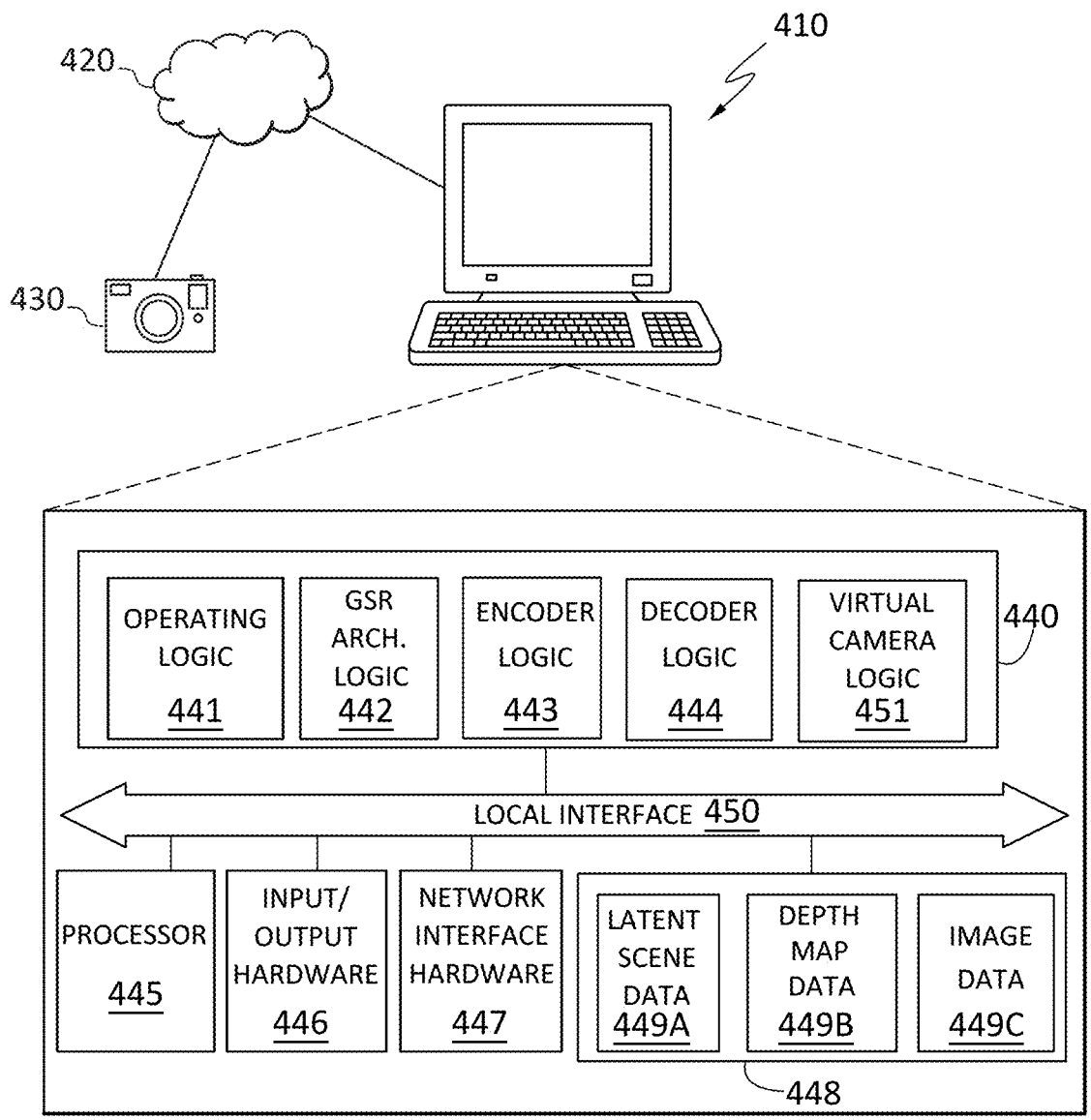
FIG. 4 schematically depicts a system for generating additional supervision data to improve learning of a geometrically-consistent latent scene representation with a geometric scene representation architecture according to one or more embodiments shown and described herein.

At block 302, images of a scene are captured by a plurality of cameras. The plurality of cameras 430 (FIG. 4). The plurality of cameras 430 provide the computing device 410 with image data 449C (FIG. 4) and camera intrinsic information. In embodiments, the computing device 410 may be communicatively coupled to the plurality of cameras 430 through a network 420. In some embodiments, the computing device 410 may be communicatively coupled directly to the plurality of cameras 430.

The image data 449C may be stored in the data storage component 448 (FIG. 4). It should be understood that the method depicted in flowchart 300 is described with reference to being implemented by a computing device 410. However, in embodiments, one or more other computing device may implement portions or all of the method described herein.

At block 304, the computing device 410 implements a GSR architecture 10. In some embodiments, the GSR architecture 10 implements a neural network or other machine-learning model that receives images from a plurality of cameras and corresponding camera embeddings to learn and ultimately generate estimated depth maps for arbitrary viewpoints within the scene. As referred to herein, the term arbitrary viewpoints refers top viewpoints of a scene that are not those captured by the plurality of cameras. In other words, the GSR architecture 10 is designed to learn a geometric scene representation for depth synthesis, including estimation, interpolation, and extrapolation. A Perceiver IO framework is to the scene representation setting, taking sequences of images and predicting a multi-view, consistent latent representation effective for downstream tasks. Downstream tasks may include robot or autonomous vehicle navigation and object interaction tasks, for example. Taking advantage of the query-based nature of the Perceiver IO architecture, a series of 3D augmentations aimed at increasing viewpoint density and diversity during training, thus encouraging (rather than enforcing) multi-view consistency provided by the GSR architecture 10. Furthermore, the GSR architecture 10 introduces view synthesis as an auxiliary task, decoded from the same latent representation, which improves depth estimation performance without requiring any additional ground-truth source.

During the encoding stage, the GSR architecture 10 takes images 449C from calibrated cameras 430, with known intrinsics and relative poses. The GSR architecture 10 processes this information according to the modality into different pixel-wise embeddings that serve as input to the Perceiver IO backbone designed for the GSR architecture 10. This encoded information can be queried using only camera embeddings, producing estimates from arbitrary viewpoints.

At block 306, in some embodiments, the images 449C from the plurality of cameras 430 are combined to generate a pointcloud of the scene. Through the intersection of images and known intrinsics and relative poses of cameras with respect to each other, depths within a combined image of the scene can be estimated to generate the pointcloud. In embodiments, the pointcloud may be a color pointcloud whereby pixels or points of the pointcloud are encoded with RGB image information so that queries of a point in the pointcloud may also provide color information in addition to a depth value.

At block 308, the computing device 410 with an encoder 100 of the GSR architecture 10 encodes the received images and camera embeddings into a latent scene representation 112. The GSR architecture 10 is designed and trained so that only a camera embedding is needed to query the latent scene representation 112 and with the decoder 120 can generate an estimated depth map 150 (or sparse depth maps 151) and an estimated scene image 140 (or sparse RGB image 141) which are arbitrary with respect to the viewpoints of the images 449C input by the plurality of cameras 430. To improve the advance the training of the GSR architecture 10 many views of a scene may be needed to learn a multi-view, consistent latent representation of the scene. However, it is not practical to capture and input many hundreds or thousands of images taken by physical cameras in an environment to train the GSR architecture to accomplish this task. However, by generating a virtual camera having a viewpoint different from the viewpoints of the plurality of cameras 430, at block 310, additional supervision data in the form of virtual cameras with corresponding ground-truth RGB images and depth maps obtained by projecting available information onto these new viewpoints as depicted in FIG. 2A can be generated. More specifically, at block 310, the computing device 410 may generate a virtual camera using virtual camera projection and canonical jittering as described herein with respect to FIGS. 2A and 2B.

In an embodiment where the virtual camera is generated using the virtual projection approach, at block 312, information from the pointcloud is projected onto the viewpoint of the virtual camera. For example, and with reference to FIG. 2A, the virtual cameras are generated by adding translation noise $\epsilon_v = (\epsilon_x, \epsilon_y, \epsilon_z)_v \sim N(0, \sigma_v)$ to the pose of a camera i. The viewing angle is set to point towards the center $c_i$ of the pointcloud $P_i$ generated by lifting information from the selected camera, which is also perturbed by $\epsilon_c = (\epsilon_x, \epsilon_y, \epsilon_z)_c \sim N(0, \sigma_v)$. When generating ground-truth information, the combined pointcloud $P_i$ of all available cameras $T_i$ is projected onto these new viewpoints $T_v$ as a way to preserve full scene geometry. Furthermore, at block 314, the decoder processes the latent scene representation based on the viewpoint of the virtual camera, which results in a sparse RGB image 141 and a sparse depth map 151.

At block 316, the computing device 410, during training of the GSR architecture utilizes the generated sparse RGB image 141 and the sparse depth map 151 to improve the GSR architecture's 10 ability to learn a geometric scene representation for depth synthesis, including estimation, interpolation, and extrapolation.

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Embodiments of the present disclosure may be implemented by a computing device, and may be embodied as computer-readable instructions stored on a non-transitory memory device, for example as a computer program product. Referring now to FIG. 4 an example system 400 for generating additional supervision data to improve learning of a geometrically-consistent latent scene representation with a geometric scene representation architecture configured as a computing device 410 is schematically illustrated. The example computing device 410 provides a system that implements and trains the GSR architecture 10 as described herein. as hardware, software, and/or firmware, according to embodiments shown and described herein. While in some embodiments, the computing device 410 may be configured as a general purpose computer with the requisite hardware, software, and/or firmware, in some embodiments, the computing device 410 may be configured as a special purpose computer designed specifically for performing the functionality described herein. It should be understood that the software, hardware, and/or firmware components depicted in FIG. 4 may also be provided in other computing devices external to the computing device 410 (e.g., data storage devices, remote server computing devices, and the like).

As also illustrated in FIG. 4, the computing device 410 (or other additional computing devices) may include a processor 445, input/output hardware 446, network interface hardware 447, a data storage component 448 (which may include latent scene data 449A, depth map data 449B, image data 449C, for example from the cameras, and any other data for performing the functionalities described herein), and a non-transitory memory component 440. The memory component 440 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 440 may be configured to store operating logic 441, GSR architecture logic 442 for providing multi-view consistent geometric scene representation for depth synthesis, including estimation, interpolation, and extrapolation, encoder logic 443 for encoding image data 449C captured by the cameras 430 into a latent scene representation 449A, decoder logic 444 for decoding the latent scene representation 449A into arbitrary estimated sparse depth maps 141 and arbitrary sparse RGB image 141 views of the scene based camera embeddings, and virtual camera logic 451 for generating additional supervision data for training the GSR architecture 10. Each logic element may be embodied as computer readable program code, firmware, or hardware, as an example. It should be understood that the data storage component 448 may reside local to and/or remote from the computing device 410, and may be configured to store one or more pieces of data for access by the computing device 410 and/or other components.

A local interface 450 is also included in FIG. 4 and may be implemented as a bus or other interface to facilitate communication among the components of the computing device 410.

The processor 445 may include any processing component configured to receive and execute computer readable code instructions (such as from the data storage component 448 and/or memory component 440). The input/output hardware 446 may include a graphics display device, keyboard, mouse, printer, camera, microphone, speaker, touch-screen, and/or other device for receiving, sending, and/or presenting data. The network interface hardware 447 may include any wired or wireless networking hardware, such as a modem, LAN port, wireless fidelity (Wi-Fi) card, WiMax card, mobile communications hardware, and/or other hardware for communicating with other networks and/or devices.

Included in the memory component 440 may be the store operating logic 441, GSR architecture logic 442, encoder logic 443, decoder logic 444, and virtual camera logic 451. The operating logic 441 may include an operating system and/or other software for managing components of the computing device 410. Similarly, the GSR architecture logic 442 may reside in the memory component 440 and may be configured to, when executed by the processor, execute processes associated with blocks 304, 306, 312 and 316 of the method depicted and described with reference to flowchart 300 in FIG. 3. The encoder logic 443 may reside in the memory component 440 and may be configured to, when executed by the processor, execute processes associated with block 308 of the method depicted and described with reference to flowchart 300 in FIG. 3. The decoder logic 444 may reside in the memory component 440 and may be configured to, when executed by the processor, execute processes associated with block 314 of the method depicted and described with reference to flowchart 300 in FIG. 3. The virtual camera logic 451 may reside in the memory component 440 and may be configured to, when executed by the processor, execute processes associated with block 310 and 312 of the method depicted and described with reference to flowchart 300 in FIG. 3.

The components illustrated in FIG. 4 are merely exemplary and are not intended to limit the scope of this disclosure. More specifically, while the components in FIG. 4 are illustrated as residing within the computing device 410, this is a non-limiting example. In some embodiments, one or more of the components may reside external to the computing device 410.

It should now be understood that embodiments of the present disclosure provide methods for 3D geometric data augmentation that utilize a virtual camera to generate additional supervision data for training a GSR architecture to learn a geometrically-consistent latent scene representation, as well as perform view synthesis as an auxiliary task. The GSR architecture can generate depth maps from arbitrary viewpoints, since it only requires camera embeddings to decode estimates. In embodiments, a method of generating additional supervision data to improve learning of a geometrically-consistent latent scene representation with a geometric scene representation architecture is provided. The method includes receiving, with a computing device, a latent scene representation encoding a pointcloud from images of a scene captured by a plurality of cameras each with known intrinsics and poses and generating a virtual camera having a viewpoint different from the viewpoints of the plurality of cameras. The method further includes projecting information from the pointcloud onto the viewpoint of the virtual camera and decoding the latent scene representation based on the virtual camera thereby generating an RGB image and depth map corresponding to the viewpoint of the virtual camera for implementation as additional supervision data.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of generating additional supervision data to improve learning of a geometrically-consistent latent scene representation with a geometric scene representation architecture, the method comprising:
   receiving, with a computing device, a latent scene representation encoding a pointcloud from images of a scene captured by a plurality of cameras each with known intrinsics and poses;
   selecting one of the plurality of cameras;
   translating a pose of the selected camera;
   adjusting a viewing angle of the translated selected camera toward a center of the pointcloud;
   generating a virtual camera having a viewpoint different from viewpoints of the plurality of cameras;
   projecting information from the pointcloud onto the viewpoint of the virtual camera; and
   decoding the latent scene representation based on the virtual camera thereby generating an RGB image and depth map corresponding to the viewpoint of the virtual camera for implementation as additional supervision data.

2. The method of claim 1, wherein translating the pose of the selected camera comprises adding translation noise to the pose of the selected camera.

3. The method of claim 1, wherein the virtual camera is generated by:
   selecting one of the plurality of cameras as a canonical camera,
   applying a rotation matrix to the canonical camera, and
   propagating a rotation and a translation offset of the canonical camera resulting from the rotation matrix to other ones of the plurality of cameras.

4. The method of claim 1, further comprising:
   implementing the geometric scene representation architecture with the computing device;
   inputting the images of the scene captured by the plurality of cameras into the geometric scene representation architecture, wherein each camera of the plurality of cameras includes known embeddings; and
   encoding the images of the scene captured by the plurality of cameras, with the geometric scene representation architecture, into the latent scene representation.

5. The method of claim 1, further comprising training the geometric scene representation architecture by inputting the RGB image and the depth map corresponding to the viewpoint of the virtual camera.

6. The method of claim 1, further comprising:
querying the latent scene representation with a camera embedding; and
decoding the latent scene representation based on the camera embedding, thereby generating an estimated depth map and an estimated RGB image based on the camera embedding.

7. A system for generating additional supervision data to improve learning of a geometrically-consistent latent scene representation with a geometric scene representation architecture, the system comprising:
one or more processors; and
a non-transitory, computer-readable medium storing instructions that, when executed by the one or more processors, cause the one or more processors to:
receive a latent scene representation encoding a pointcloud from images of a scene captured by a plurality of cameras each with known intrinsics and poses;
select one of the plurality of cameras;
translate a pose of the selected camera;
adjust a viewing angle of the translated selected camera toward a center of the pointcloud;
generate a virtual camera having a viewpoint different from viewpoints of the plurality of cameras;
project information from the pointcloud onto the viewpoint of the virtual camera; and
decode the latent scene representation based on the virtual camera thereby generating an RGB image and depth map corresponding to the viewpoint of the virtual camera for implementation as additional supervision data.

8. The system of claim 7, wherein translating the pose of the selected camera comprises adding translation noise to the pose of the selected camera.

9. The system of claim 7, wherein the virtual camera is generated by:
selecting one of the plurality of cameras as a canonical camera,
applying a rotation matrix to the canonical camera, and
propagating a rotation and a translation offset of the canonical camera resulting from the rotation matrix to other ones of the plurality of cameras.

10. The system of claim 7, wherein the instructions further cause the one or more processors to:
implement the geometric scene representation architecture with the system;
input the images of the scene captured by the plurality of cameras into the geometric scene representation architecture, wherein each camera of the plurality of cameras includes known embeddings; and
encode the images of the scene captured by the plurality of cameras, with the geometric scene representation architecture, into the latent scene representation.

11. The system of claim 7, wherein the instructions further cause the one or more processors to train the geometric scene representation architecture by inputting the RGB image and the depth map corresponding to the viewpoint of the virtual camera.

12. The system of claim 7, wherein the instructions further cause the one or more processors to:
query the latent scene representation with a camera embedding; and
decode the latent scene representation based on the camera embedding, thereby generating an estimated depth map and an estimated RGB image based on the camera embedding.

13. A computing program product for generating additional supervision data to improve learning of a geometrically-consistent latent scene representation with a geometric scene representation architecture, the computing program product comprising machine-readable instructions stored on a non-transitory computer readable memory, which when executed by a computing device, causes the computing device to carry out steps comprising:
receiving, with the computing device, a latent scene representation encoding a pointcloud from images of a scene captured by a plurality of cameras each with known intrinsics and poses;
selecting one of the plurality of cameras;
translating a pose of the selected camera;
adjusting a viewing angle of the translated selected camera toward a center of the pointcloud;
generating a virtual camera having a viewpoint different from viewpoints of the plurality of cameras;
projecting information from the pointcloud onto the viewpoint of the virtual camera; and
decoding the latent scene representation based on the virtual camera thereby generating an RGB image and depth map corresponding to the viewpoint of the virtual camera for implementation as additional supervision data.

14. The computing program product of claim 13, wherein translating the pose of the selected camera comprises adding translation noise to the pose of the selected camera.

15. The computing program product of claim 13, wherein the virtual camera is generated by:
selecting one of the plurality of cameras as a canonical camera,
applying a rotation matrix to the canonical camera, and
propagating a rotation and a translation offset of the canonical camera resulting from the rotation matrix to other ones of the plurality of cameras.

16. The computing program product of claim 13, the steps caused to be carried out by
the computing device further comprising:
implementing the geometric scene representation architecture with the computing device;
inputting the images of the scene captured by the plurality of cameras into the geometric scene representation architecture, wherein each camera of the plurality of cameras includes known embeddings; and
encoding the images of the scene captured by the plurality of cameras, with the geometric scene representation architecture, into the latent scene representation.

17. The computing program product of claim 13, the steps caused to be carried out by the computing device further comprising training the geometric scene representation architecture by inputting the RGB image and the depth map corresponding to the viewpoint of the virtual camera.

* * * * *